United States Patent
Kim et al.

(10) Patent No.: US 12,374,756 B2
(45) Date of Patent: Jul. 29, 2025

(54) POROUS SEPARATOR AND ELECTROCHEMICAL DEVICE INCLUDING THE SAME

(71) Applicant: LG Energy Solution, Ltd., Seoul (KR)

(72) Inventors: Min-Ji Kim, Daejeon (KR); Seung-Hyun Lee, Daejeon (KR); So-Mi Jeong, Daejeon (KR); Da-Kyung Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 628 days.

(21) Appl. No.: 17/633,683

(22) PCT Filed: Aug. 7, 2020

(86) PCT No.: PCT/KR2020/010510
§ 371 (c)(1),
(2) Date: Feb. 8, 2022

(87) PCT Pub. No.: WO2021/029630
PCT Pub. Date: Feb. 18, 2021

(65) Prior Publication Data
US 2022/0320683 A1  Oct. 6, 2022

(30) Foreign Application Priority Data
Aug. 9, 2019 (KR) .......................... 10-2019-0097678

(51) Int. Cl.
*H01M 50/446* (2021.01)
*H01M 50/406* (2021.01)
(Continued)

(52) U.S. Cl.
CPC ....... *H01M 50/446* (2021.01); *H01M 50/406* (2021.01); *H01M 50/426* (2021.01); *H01M 50/431* (2021.01)

(58) Field of Classification Search
CPC . H01M 50/426; H01M 50/431; H01M 50/446
See application file for complete search history.

(56) References Cited

U.S. PATENT DOCUMENTS 11,811,093 B2 * 11/2023 Jeong ................ H01M 50/451
2013/0244080 A1  9/2013 Song et al.
(Continued)

FOREIGN PATENT DOCUMENTS

CN  107998897 A  *  5/2018  ........... B01D 67/009
CN  108370026 A     8/2018
(Continued)

OTHER PUBLICATIONS

Chen et al,Exploring Chemical, Mechanical, and Electrical Functionalities of Binders for Advanced Energy-Storage Devices, Chemical Reviews, 118, 8936-8982 (2018). (Year: 2018).*
(Continued)

*Primary Examiner* — Amanda C. Walke
(74) *Attorney, Agent, or Firm* — Morgan, Lewis & Bockius LLP

(57) ABSTRACT

Disclosed is a free-standing porous separator including a plurality of inorganic particles and a binder polymer positioned on the whole or a part of the surface of the inorganic particles to connect the inorganic particles with one another and fix them, wherein the binder polymer comprises a polyvinylidene fluoride (PVdF)-based binder polymer modified with an ester (COO)- or carboxyl (COOH)-containing monomer. An electrochemical device including the free-standing porous separator is also disclosed. It is possible to provide a porous separator which has a reduced dimensional change in an electrolyte, while showing improved tensile strength and/or elongation at the same time.

19 Claims, 2 Drawing Sheets

(51) Int. Cl.
*H01M 50/426* (2021.01)
*H01M 50/431* (2021.01)

(56) References Cited

U.S. PATENT DOCUMENTS

| | | |
|---|---|---|
| 2018/0366733 A1 | 12/2018 | Takaoka et al. |
| 2021/0036287 A1* | 2/2021 | Lee .................. C08L 27/16 |

FOREIGN PATENT DOCUMENTS

| | | | |
|---|---|---|---|
| CN | 109004150 A | | 12/2018 |
| JP | H11-66949 A | | 3/1999 |
| JP | 2011071009 A | * | 4/2011 |
| JP | 2015-172101 A | | 10/2015 |
| JP | WO2017/098682 A1 | | 6/2017 |
| JP | 2019216033 A | * | 12/2019 |
| KR | 10-2000-0055679 A | | 9/2000 |
| KR | 10-2016-0066498 A | | 6/2016 |
| KR | 10-2017-0007850 A | | 1/2017 |
| KR | 10-1865171 B1 | | 6/2018 |
| KR | 10-2019-0025462 A | | 3/2019 |
| KR | 10-2019-0048864 A | | 5/2019 |
| KR | 10-2019-0049604 A | | 5/2019 |

OTHER PUBLICATIONS

Machine translation of CN third rejection (no date) (Year: 0000).*
International Search Report issued in corresponding International Patent Application No. PCT/KR2020/010510 dated Dec. 1, 2020.
Office Action issued Sep. 29, 2023 for counterpart Chinese Patent Application No. 202080056244.5.
Kim et al., "Positive Effects of E-Beam Irradiation in Inorganic Particle Based Separators for Lithium-Ion Battery," Journal of the Electrochemical Society, 157(1), A31-A34 (2010).
Kang et al., "Application and modification of poly(vinylidene fluoride) (PVDF) membranes—A review," Journal of Membrane Science, 463 (2014) 145-165.
Fedelich et al., "Application Handbook Thermal Analysis of Polymers Selected Applications Thermal Analysis," Mettler Toledo (2013) 1-39.
Extended European Search Report issued in corresponding European Patent Application No. 20853426.3 dated Nov. 9, 2022.
Office Action issued in related Chinese Patent Application No. 202080056244.5, dated Feb. 25, 2025.

* cited by examiner

POROUS SEPARATOR AND ELECTROCHEMICAL DEVICE INCLUDING THE SAME

TECHNICAL FIELD

The present disclosure relates to a porous separator and an electrochemical device including the same. Particularly, the present disclosure relates to a porous separator having improved mechanical properties and inhibiting a dimensional change in an electrolyte, and an electrochemical device including the same.

The present application claims priority to Korean Patent Application No. 10-2019-0097678 filed on Aug. 9, 2019 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices, such as lithium secondary batteries, have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode.

To solve the above-mentioned safety problems of an electrochemical device, there has been suggested a separator having a porous organic-inorganic coating layer formed by coating a mixture of an excessive amount of inorganic particles with a binder polymer onto at least one surface of a porous polymer substrate having a plurality of pores.

However, while forming the porous organic-inorganic coating layer, coating defects may be generated on the surface due to the cracking that occurs during a drying process, or the like. For this reason, the coating layer may be detached with ease when a secondary battery is assembled or used, resulting in degradation of battery safety. In addition, the slurry for forming a porous coating layer applied to the polyolefin-based porous substrate in order to form the coating layer may have a portion where particles are packed with higher density due to an increase in density of particles during drying to cause the problem of degradation of air permeability. Further, when the porous coating layer is formed on a polyolefin substrate, there are problems in that the separator shows low adhesion to an electrode and has a relatively large thickness which does not meet a recent tendency of thin filming of a separator. Therefore, the inventors of the present disclosure have conducted many studies to provide a free-standing porous separator using no porous polymer substrate in order to solve the above-mentioned problem fundamentally.

DISCLOSURE

Technical Problem

The present disclosure is designed to solve the problems of the related art, and therefore the present disclosure is directed to providing a free-standing porous separator which causes no heat shrinking phenomenon even when being exposed to a high temperature of 120° C. or higher, unlike a separator using a polyolefin-based porous polymer substrate, and thus has improved safety.

The inventors of the present disclosure have found the problem of a dimensional change from side to side of a free-standing porous separator generated due to the swelling of the separator, when the separator is impregnated with an electrolyte. The problem did not appear, when using a polyolefin-based porous polymer substrate. The inventors of the present disclosure have conducted many studies to provide a free-standing porous separator which solves the problem generated when a polyolefin-based porous polymer substrate is not used, i.e. the problem of a dimensional change caused by swelling. In addition, the present disclosure is directed to providing a solution for preventing the problem of a defect in cell appearance generated due to such a dimensional change, or bubble generation in a cell, caused by formation of a gap between an electrode and a free-standing porous separator. As a dimensional change occurs, interfacial resistance may be generated between an electrode and a free-standing porous separator. The present disclosure is directed to solving the problems of deposition of lithium and a rapid increase in cell resistance, caused by such interfacial resistance.

The present disclosure is also directed to providing a free-standing porous separator which improves tensile strength decreased as compared to a separator using a polyolefin porous polymer substrate.

As used herein, 'dimensional change or dimensional change rate' refers to a change (an increase or decrease) in dimension of a free-standing porous separator using no porous polymer substrate after being impregnated with an electrolyte, as expressed by the percentage (%) based on the dimension of the same separator before being impregnated with an electrolyte.

Further, the present disclosure is directed to providing an electrochemical device including the porous separator.

Technical Solution

In one aspect of the present disclosure, there is provided a free-standing porous separator according to any one of the following embodiments.

According to the first embodiment, there is provided a free-standing porous separator which includes a plurality of inorganic particles and a binder polymer positioned on the whole or a part of the surface of the inorganic particles to connect the inorganic particles with one another and fix them, wherein the binder polymer includes a polyvinylidene fluoride (PVdF)-based binder polymer modified with an ester (COO)- or carboxyl (COOH)-containing monomer.

According to the second embodiment, there is provided the free-standing porous separator as defined in the first embodiment, wherein the content of the monomer is 0.1-10 wt % based on 100 wt % of the modified polyvinylidene fluoride (PVdF).

According to the third embodiment, there is provided the free-standing porous separator as defined in the first or the second embodiment, wherein the modified polyvinylidene fluoride (PVdF)-based binder polymer has a weight average molecular weight of 600,000-2,000,000 g/mol.

According to the fourth embodiment, there is provided the free-standing porous separator as defined in any one of the first to the third embodiments, wherein the weight ratio of the inorganic particles to the binder polymer is 60:40-90:10.

According to the fifth embodiment, there is provided the free-standing porous separator as defined in any one of the first to the fourth embodiments, wherein the inorganic particles include inorganic particles having a dielectric constant of 5 or more, inorganic particles having lithium ion transportability, or a mixture thereof.

According to the sixth embodiment, there is provided the free-standing porous separator as defined in any one of the first to the fifth embodiments, wherein the modified polyvinylidene fluoride (PVdF)-based binder polymer has a melting point equal to or higher than 150° C. and lower than 170° C.

According to the seventh embodiment, there is provided the free-standing porous separator as defined in any one of the first to the sixth embodiments, wherein the content of the monomer is 0.1-5 wt % based on 100 wt % of the modified polyvinylidene fluoride (PVdF).

According to the eighth embodiment, there is provided the free-standing porous separator as defined in any one of the first to the seventh embodiments, wherein the polyvinylidene fluoride-based binder polymer includes any one selected from homo-polyvinylidene fluoride, polyvinylidene fluoride-co-hexafluoropropylene, polyvinylidene fluoride-co-chlorotrifluoroethylene, polyvinylidene fluoride-co-trichloroethylene, polyvinylidene fluoride-co-trifluoropropylene and polyvinylidene fluoride-co-tetrafluoropropylene, or a mixture of two or more them.

According to the ninth embodiment, there is provided the free-standing porous separator as defined in any one of the first to the eighth embodiments, wherein the inorganic particles in the porous separator are bound to one another by the binder polymer, while they are packed and are in contact with one another, thereby forming interstitial volumes among the inorganic particles, and the interstitial volumes among the inorganic particles become vacant spaces to form pores.

According to the tenth embodiment, there is provided the free-standing porous separator as defined in any one of the first to the ninth embodiments, which has a thickness of 5-100 μm.

In another aspect of the present disclosure, there is provided an electrochemical device according to any one of the following embodiments.

According to the eleventh embodiment, there is provided an electrochemical device including a positive electrode, a negative electrode and a separator interposed between the positive electrode and the negative electrode, wherein the separator is the free-standing porous separator as defined in any one of the first to the tenth embodiments.

According to the twelfth embodiment, there is provided the electrochemical device as defined in the eleventh embodiment, which is a lithium secondary battery.

In still another aspect of the present disclosure, there is provided a method for manufacturing a free-standing porous separator according to any one of the following embodiments.

According to the thirteenth embodiment, there is provided a method for manufacturing the free-standing porous separator as defined in any one of the first to the tenth embodiments, including the steps of:

preparing slurry for forming a porous separator containing inorganic particles and a binder polymer; and applying the slurry to one surface of a release substrate, drying the slurry and removing the release substrate, or preparing slurry for forming a porous separator containing inorganic particles and a binder polymer; and applying the slurry for forming a porous separator directly to one surface of at least one electrode layer selected from a positive electrode and a negative electrode, and drying the slurry to obtain an electrode-porous separator composite bound directly to the electrode layer.

According to the fourteenth embodiment, there is provided the method for manufacturing the free-standing porous separator as defined in the thirteenth embodiment, wherein the slurry for forming a porous separator is applied to the release substrate or the electrode layer through a solvent casting or slot coating process.

Advantageous Effects

The porous separator according to an embodiment of the present disclosure is not provided with a polyolefin-based porous substrate to save the cost. In addition, it is possible to control the pore size and porosity of the whole separator, and thus to realize a uniform porous separator. In addition, the separator may be provided with a small thickness to reduce the weight and to increase the energy density advantageously. In addition, even when the separator is exposed to a high temperature of 120° C. or higher, no heat shrinking occurs, and thus the separator can provide a battery with improved safety.

According to an embodiment of the present disclosure, it is possible to provide a porous separator which shows a reduced dimensional change in an electrolyte and overcomes the problem occurring in a free-standing porous separator according to the related art.

According to an embodiment of the present disclosure, it is possible to provide a porous separator which shows improvement in tensile strength and/or elongation decreased as compared to a porous separator using a polyolefin-based porous polymer substrate.

BEST MODE

Figure 1:
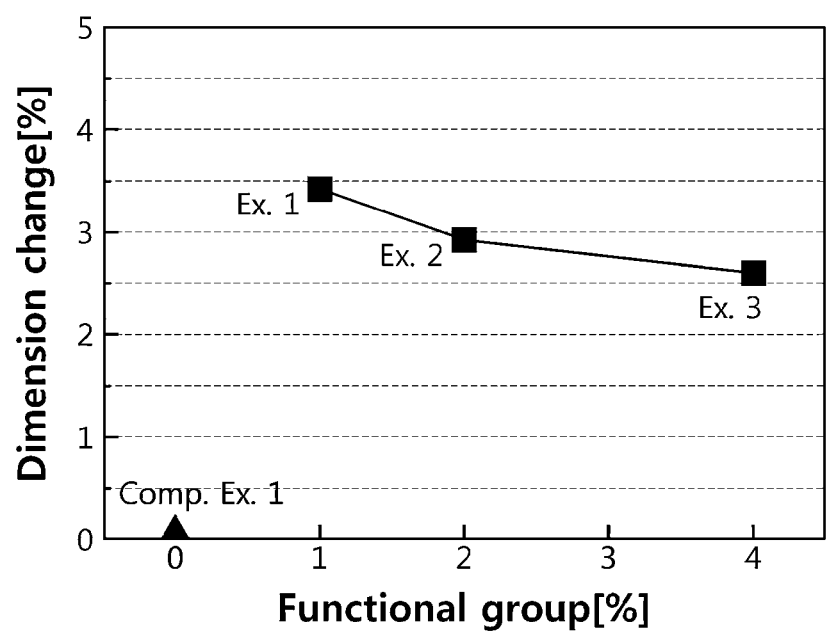
FIG. 1 is a graph illustrating dimensional changes of the porous separators obtained according to Examples 1-3, after the porous separators are impregnated with an electrolyte.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect of the present disclosure, there is provided a free-standing porous separator which includes a plurality of inorganic particles and a binder polymer positioned on the whole or a part of the surface of the inorganic particles to connect the inorganic particles with one another and fix them, wherein the binder polymer includes a polyvinylidene fluoride (PVdF)-based binder polymer modified with an ester (COO)- or carboxyl (COOH)-containing monomer.

The porous separator according to the present disclosure may be interposed between a positive electrode and a negative electrode to function as a separator. Therefore, the porous separator may correspond to a porous separating layer. In addition, in terms of constitutional elements, the porous separator includes a combination of an organic material with an inorganic material, and thus may correspond to an organic-inorganic composite.

Since such an organic-inorganic composite merely includes an inorganic material and a binder polymer with no porous polymer substrate, it has lower tensile strength and elongation as compared to a porous polymer substrate, and thus causes problems in that it is highly likely that the separator is torn during mass production and assemblage or generates an internal micro-short. In addition, the organic-inorganic composite merely includes inorganic particles and a binder polymer, and thus may be swelled, when being impregnated with an electrolyte, to cause defects in appearance, when being applied to a secondary battery.

According to the present disclosure, a modified binder polymer is used in order to increase tensile strength, while inhibiting such a swelling phenomenon, when the porous separator is impregned with an electrolyte.

Since a free-standing porous separator uses no polyolefin porous polymer substrate, it causes no heat shrinking phenomenon, when being exposed to a high temperature of 120° C. or higher, resulting in improvement of safety. However, the inventors of the present disclosure have found the problem of a dimensional change occurring from side to side of the separator due to swelling, when the free-standing porous separator is impregnated with an electrolyte. The above-mentioned problem did not appear, when a polyolefin-based porous polymer substrate is used. The inventors of the present disclosure have conducted many studies to provide a free-standing porous separator which solves the problem generated when a polyolefin-based porous polymer substrate is not used, i.e. the problem of a dimensional change caused by swelling. In addition, the present disclosure is directed to providing a solution for preventing the problem of a defect in cell appearance generated due to such a dimensional change, or bubble generation in a cell, caused by formation of a gap between an electrode and a free-standing porous separator. As a dimensional change occurs, interfacial resistance may be generated between an electrode and a free-standing porous separator. The present disclosure is directed to solving the problems of deposition of lithium and a rapid increase in cell resistance, caused by such interfacial resistance.

The present disclosure is also directed to providing a free-standing porous separator which improves tensile strength decreased as compared to a separator using a polyolefin porous polymer substrate.

Particularly, according to an embodiment of the present disclosure, the free-standing porous separator includes a modified polyvinylidene fluoride-based binder polymer including 0.1-10 wt % of an ester (COO)- or carboxyl (COOH)-containing monomer based on 100 wt % of the modified polyvinylidene fluoride (PVdF). According to a particular embodiment of the present disclosure, the content of the monomer may be 0.1-5 wt % based on 100 wt % of the modified polyvinylidene fluoride (PVdF). When a non-modified polyvinylidene fluoride-based binder polymer is used, adhesion between binder polymers is too poor to form a film. Meanwhile, when the content of the monomer is larger than 10 wt %, slurry aggregation may occur due to excessive binding force.

According to an embodiment of the present disclosure, when polyvinylidene fluoride is modified with an ester (COO)- or carboxyl (COOH)-containing monomer, tensile strength is increased. It is thought that this is because the structure of the binder polymer improves the binding force between the inorganic particles and the binder polymer. Particularly, when the content of the monomer is 0.1-10 wt %, tensile strength is increased. If a non-modified polyvinylidene fluoride-based binder polymer is used, the binding force between the inorganic particles and the binder polymer is reduced to cause a decrease in tensile strength. When the content of the monomer is larger than 10 wt %, slurry aggregation may occur due to excessive binding force. In this case, it is difficult to ensure slurry stability.

According to an embodiment of the present disclosure, the polyvinylidene fluoride-based binder polymer may include any one selected from homo-polyvinylidene fluoride, polyvinylidene fluoride-co-hexafluoropropylene, polyvinylidene fluoride-co-chlorotrifluoroethylene, polyvinylidene fluoride-co-trichloroethylene, polyvinylidene fluoride-co-trifluoropropylene and polyvinylidene fluoride-co-tetrafluoropropylene, or a mixture of two or more them.

According to an embodiment of the present disclosure, the binder polymer may have a weight average molecular weight of 600,000 g/mol or more, 700,000 g/mol or more, or 800,000 g/mol or more, and 2,000,000 g/mol or less, 1,600,000 g/mol or less, 1,500,000 g/mol or less, or 1,200,000 g/mol or less. Within the above-defined range, it is possible to prevent the problems of a significant decrease in strength of a separator and a failure in realizing a free-standing film having no porous substrate as a support. In addition, the above-defined range of weight average molecular weight provides adequate viscosity to facilitate the manufacturing process.

The weight average molecular weight (Mw) of the binder polymer is the weight average molecular weight (Mw) expressed on the basis of polystyrene and is determined by gel permeation chromatography (GPC).

According to an embodiment of the present disclosure, the modified polyvinylidene fluoride (PVdF)-based binder polymer has a larger weight average molecular weight as compared to a binder polymer including homo-polyvinylidene fluoride-based binder alone, and thus may have a melting point equal to or higher than 150° C. and lower than 170° C. due to such an increase in weight average molecular weight. More particularly, the modified polyvinylidene fluoride may have a melting point equal to or higher than 160° C. and lower than 170° C. Within the above-defined range, the porous separator has excellent heat resistance and shows a small dimensional change in an electrolyte advantageously.

Meanwhile, according to an embodiment of the present disclosure, the porous separator may have a thickness of 5-100 μm.

The porous separator according to an embodiment of the present disclosure may further include a binder polymer having a glass transition temperature ($T_g$) of −200 to 200° C. This is because such a polymer can improve the mechanical properties, such as flexibility and elasticity, of the finally formed porous separator. Such a binder polymer functions as a binder which connects and stably fixes the inorganic particles with one another, and thus contributes to prevention of degradation of mechanical properties of the porous separator.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

In the porous separator, the inorganic particles are bound to one another by the binder polymer, while they are packed and are in contact with one another, thereby forming interstitial volumes among the inorganic particles, and the interstitial volumes among the inorganic particles become vacant spaces to form pores.

In other words, the binder polymer attaches the inorganic particles to one another so that they may retain their binding states. For example, the binder polymer connects and fixes the inorganic particles with one another. In addition, the pores of the porous separator are those formed by the interstitial volumes among the inorganic particles which become vacant spaces. The space may be defined by the inorganic particles facing each other substantially in a closely packed or densely packed structure of the inorganic particles.

The binder polymer that may be used additionally is not particularly limited and any binder polymer may be used, as long as it is one used conventionally in the art. For example, the binder polymer may include, but is not limited to: polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

Non-limiting examples of the inorganic particles include high-dielectric constant inorganic particles having a dielectric constant of 5 or more, particularly 10 or more, inorganic particles having lithium ion transportability or a mixture thereof.

The inorganic particles having a dielectric constant of 5 or more may include any one selected from the group consisting of $BaTiO_3$, $Pb(Zr, Ti)O_3$ (PZT), $Pb_{1-x}La_xZr_{1-y}Ti_yO_3$ (PLZT), $Pb(Mg_{1/3}Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, AlO(OH), $Al_2O_3H_2O$, or a mixture thereof.

In addition, the inorganic particles having lithium ion transportability refer to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture thereof.

In addition, the content of the modified binder polymer may be 13-27 wt %, particularly 18-22 wt % based on the total weight of the porous separator. When the content is expressed in terms of volume, the modified polymer may be used at 20-60 vol %, or 27-43 vol %, based on the total volume of the porous separator. When the content of the binder polymer satisfies the above-defined range, it is possible to prevent the problem of a decrease in pore size and porosity, caused by the presence of an excessive amount of binder polymer in the pores of the resultant porous separator. It is also possible to fix the inorganic particles stably by the binder polymer, while preventing detachment of the inorganic particles during the manufacture of the porous separator, or during the storage or operation of the electrochemical device provided with the porous separator.

The porous separator according to an embodiment of the present disclosure may further include other additives, besides the above-described inorganic particles and binder polymer.

The porous separator according to an embodiment of the present disclosure may be obtained by preparing slurry for forming a porous separator including inorganic particles and a binder polymer, applying the slurry to one surface of a release substrate, drying the slurry, and removing the release substrate. In a variant, the porous separator may be obtained by applying the slurry for forming a porous separator directly to one surface of at least one electrode layer selected from a positive electrode and a negative electrode, and drying the slurry to provide an electrode-porous separator composite bound directly to the electrode layer.

First, the slurry for forming a porous separator may be prepared by dissolving a binder polymer into a solvent, adding the inorganic particles thereto and dispersing them. The inorganic particles may be added after they are pulverized in advance to a predetermined average particle diameter. Otherwise, the inorganic particles may be added to a binder polymer solution, and then pulverized and dispersed, while controlling them to have a predetermined average particle diameter by using a ball milling process, or the like.

Although there is no particular limitation in the method for coating (applying) the slurry for forming a porous separator to the release substrate or the electrode layer, solvent casting or slot coating may be used preferably. A slot coating process includes coating a composition supplied through a slot die onto the whole surface of a substrate and is capable of controlling the thickness of a coating layer depending on the flux supplied from a metering pump.

Then, the release substrate coated with the slurry for forming a porous separator is dried by using a dryer, such as an oven, and the release substrate is removed to obtain a porous separator. Particular examples of the release substrate include a glass plate, polyethylene film, polyester film or the like, but are not limited thereto.

In a variant, when the slurry for forming a porous separator is coated directly on the electrode layer, it may be dried in the same manner as mentioned above to provide an electrode-porous separator composite.

In another aspect, there is provided an electrochemical device including a positive electrode, a negative electrode and a separator interposed between the positive electrode and the negative electrode, wherein the separator is the above-described porous separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, positive electrode and negative electrode, used in combination with the separator according to the present disclosure are not particularly limited, and may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Determination of Weight Average Molecular Weight (Mw)

Weight average molecular weight was determined by using gel permeation chromatography (GPC) under the following conditions:

Instrument: 1200 series available from Agilent technologies Co.

Column: Two PLgel mixed B columns available from Polymer laboratories Co. are used.

Solvent: Tetrahydrofuran (THF)
Column temperature: 40° C.
Sample concentration: 1 mg/mL, 100L injected.
Standard: Polystyrene (Mp: 3900000, 723000, 316500, 52200, 31400, 7200, 3940, 485)

Determination of Type and Content of Monomer in Modified Binder Polymer

Types and contents of monomers were determined by using NMR spectrometry under the following conditions. Particularly, the ratio of a monomer in a modified binder polymer may be calculated from the peak area ratio derived from carboxyl groups and the main chain ($-CH_2CF_2-$) $CH_2$ of polyvinylidene fluoride, determined by using $^1$H-NMR spectrometry.

Instrument: AVANCE AC 400 FT spectrometer (Bruker Co.)
Frequency used for determination: 400 MHz
Solvent used for determination: Dimethyl sulfoxide (DMSO)
Temperature during determination: 25° C.

Example 1

<Manufacture of Positive Electrode and Negative Electrode>

First, 96.7 parts by weight of $LiCoO_2$ functioning as a positive electrode active material, 1.3 parts by weight of graphite functioning as a conductive material and 2.0 parts by weight of polyvinylidene fluoride (PVdF) functioning as a binder were mixed to prepare a positive electrode mixture. The resultant positive electrode mixture was dispersed in N-methyl-2-pyrrolidone functioning as a solvent to prepare positive electrode slurry. The slurry was coated on both surfaces of aluminum foil having a thickness of 20 μm, followed by drying and pressing, to obtain a positive electrode.

Next, 97.6 parts by weight of graphite functioning as a negative electrode active material was mixed with 1.2 parts by weight of styrene-butadiene rubber (SBR) and 1.2 parts by weight of carboxymethyl cellulose (CMC) functioning as binders to obtain a negative electrode mixture. The negative electrode mixture was dispersed in ion exchange water functioning as a solvent to prepare negative electrode slurry. The slurry was coated on both surfaces of copper foil having a thickness of 20 μm, followed by drying and pressing, to obtain a negative electrode.

<Manufacture of Porous Separator>

A modified binder polymer including homo-polyvinylidene fluoride (homo-PVdF) substituted with 1% of a carboxyl (COOH)-containing monomer was prepared. Particularly, 7 parts by weight of the modified binder polymer having a weight average molecular weight of 600,000 g/mol was added to 93 parts by weight of N-methyl-2-pyrrolidone and dissolved therein at 50° C. to prepare a binder polymer solution. Then, inorganic particles, boehmite (AlOOH) having an average particle diameter of 250 nm were added to the prepared binder polymer solution so that the weight ratio of the boehmite to binder polymer might be 80:20, and dispersed therein to prepare slurry for a porous separator. Herein, the content of the binder polymer was 20 wt % (corresponding to 30 vol %) based on the total weight of the porous separator.

The prepared slurry was applied onto a glass plate through solvent casting and the coating thickness was controlled to about 20 μm. Then, the slurry was dried in an oven at 150° C. for 30 minutes and the substrate was removed to obtain a porous separator.

<Manufacture of Lithium Secondary Battery>

$LiPF_6$ was dissolved in an organic solvent containing a mixture of ethylene carbonate (EC), propylene carbonate (PC) and diethyl carbonate (DEC) at a volume ratio of 3:3:4 to a concentration of 1.0M to prepare a non-aqueous electrolyte.

The porous separator was interposed between the positive electrode and the negative electrode, the resultant structure was received in a pouch, and the electrolyte was injected thereto to obtain a lithium secondary battery.

Example 2

A modified binder polymer including polyvinylidene fluoride (homo-PVdF) substituted with 2% of a carboxyl (COOH)-containing monomer, based on 100 wt % of the modified PVdF-based binder polymer, was prepared. Particularly, a porous separator and a lithium secondary battery were obtained in the same manner as Example 1, except that the modified PVdF-based binder polymer having a weight average molecular weight of 600,000 g/mol was used.

Example 3

A modified binder polymer including polyvinylidene fluoride (homo-PVdF) substituted with 4% of a carboxyl (COOH)-containing monomer, based on 100 wt % of the modified PVdF-based binder polymer, was prepared. Particularly, a porous separator and a lithium secondary battery were obtained in the same manner as Example 1, except that the modified PVdF-based binder polymer having a weight average molecular weight of 600,000 g/mol was used.

Comparative Example 1

A porous separator and a lithium secondary battery were obtained in the same manner as Example 1, except that homo-polyvinylidene fluoride (homo-PVdF), not substituted with a functional group, i.e. not modified with a substituent, and having a weight average molecular weight of 600,000 g/mol was used.

Evaluation of Physical Properties
Evaluation of Dimensional Change

Each of the porous separators obtained from Examples 1-3 and Comparative Example 1 was evaluated in terms of a dimensional change upon the impregnation with an electrolyte according to the following method. The results are shown in the following Table 1. In addition, each of the porous separators according to Examples 1-3 was evaluated in terms of a dimensional change. The results are shown in FIG. 1.

<Method for Determination of Dimensional Change>

Two sheets of each separator were prepared with a size of 100×100 mm and dipped in a 500 mL Nalgen bottle containing 10 mL of an electrolyte. After 1 hour, each separator was positioned on a PET film and an increase in length based on the initial length was measured in the width/length direction. The average of the two porous separator sheets was defined as a dimensional change.

Evaluation of Tensile Strength

Figure 2:
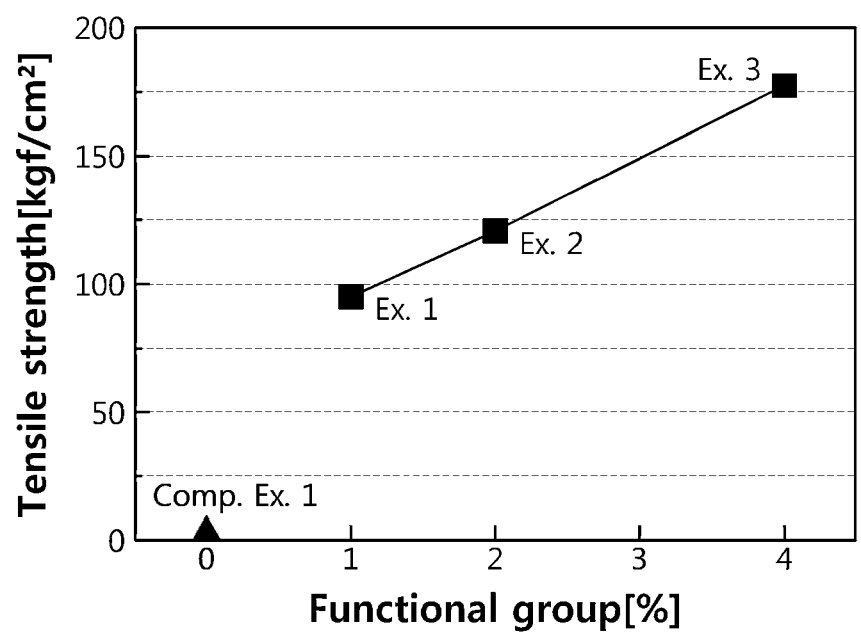
FIG. 2 is a graph illustrating tensile strength of each of the porous separators obtained according to Examples 1-3.

Each of the porous separators obtained from Examples 1-3 and Comparative Example 1 was evaluated in terms of tensile strength according to the following method. The results are shown in Table 1. In addition, each of the porous separators obtained from Examples 1-3 was evaluated in terms of tensile strength according to the following method. The results are shown in FIG. 2.

<Method for Determination of Tensile Strength>

Six sheets of each porous separator were prepared with a size of 100×20 mm, and the tensile strength was determined with an instrument available from Instron Co. by drawing the porous separator at 500 mm/min and at room temperature until it was broken. The average of the six porous separator sheets was defined as tensile strength. Herein, the sample area used for determination is 20×20 mm.

Evaluation of Elongation

Each of the porous separators obtained from Examples 1-3 and Comparative Example 1 was evaluated in terms of elongation according to the following method. The results are shown in Table 1.

<Method for Determination of Elongation>

Six sheets of each porous separator were prepared with a size of 100×20 mm, were drawn with an instrument available from Instron Co. at 500 mm/min and at room temperature, and an increase in length of each porous separator was measured until it was broken. The ratio of the increase in length of each porous separator was calculated based on the initial length thereof and the average of the six porous separator sheets was defined as elongation. Herein, the sample area used for determination is 20×20 mm.

TABLE 1

| | Comp. Ex. 1 | Ex. 1 | Ex. 2 | Ex. 3 |
|---|---|---|---|---|
| Content of Modified Monomer (Substitution with Functional Group) | 0 | 1 | 2 | 4 |
| Thickness | Free-standing porous separator cannot be obtained due to low strength | | | |
| Tensile Strength (kgf/cm$^2$) | | 93 | 120 | 176 |
| Elongation (%) | | 15.8 | 6.4 | 4.2 |
| Ion conductivity (10$^{-4}$ S/cm) | | 7.6 | 9.7 | 8.4 |
| Dimensional change (%) | | 3.4 | 2.9 | 2.6 |

Referring to FIG. 1, FIG. 2 and Table 1, when a binder polymer not modified with a monomer is used in Comparative Example 1, it is not possible to form a film. Particularly, in the case of Comparative Example 1, homo-polyvinylidene fluoride having a weight average molecular weight of 600,000 g/mol is used, and thus adhesion between binder polymers is low and no film can be formed due to the absence of substitution with a monomer.

Meanwhile, in the case of Examples 1-3, a binder polymer including homo-polyvinylidene fluoride substituted with 1-4 wt % of carboxyl groups is used. It can be seen that the separators show an improvement in dimensional change and provide increased tensile strength.

What is claimed is:

1. A free-standing porous separator comprising a plurality of inorganic particles and a binder polymer positioned on an entire surface or a part of surface of the inorganic particles to connect the inorganic particles with one another and fix the inorganic particles,
   wherein the binder polymer comprises a modified polyvinylidene fluoride (PVdF)-based binder polymer modified with an ester (COO)- or carboxyl (COOH)-containing monomer, and
   wherein the modified PVdF-based binder polymer has a weight average molecular weight of 600,000 or more and less than 1,200,000 g/mol.

2. The free-standing porous separator according to claim 1, wherein a content of the ester (COO)- or carboxyl (COOH)-containing monomer moiety in the modified PVdF-based binder polymer is 0.1-10 wt % based on 100 wt % of the modified PVdF-based binder polymer.

3. The free-standing porous separator according to claim 1, wherein a weight ratio of the inorganic particles to the binder polymer is 60:40-90:10.

4. The free-standing porous separator according to claim 1, wherein the inorganic particles comprise inorganic particles having a dielectric constant of 5 or more, inorganic particles having lithium ion transportability, or a mixture thereof.

5. The free-standing porous separator according to claim 1, wherein the modified PVdF-based binder polymer has a melting point equal to or higher than 150° C. and lower than 170° C.

6. The free-standing porous separator according to claim 1, wherein a content of the ester (COO)- or carboxyl (COOH)-containing monomer moiety in the modified PVdF-based binder polymer is 0.1-5 wt % based on 100 wt % of the modified PVdF-based binder polymer.

7. The free-standing porous separator according to claim 1, wherein the modified PVdF-based binder polymer comprises one selected from the group consisting of homo-polyvinylidene fluoride, polyvinylidene fluoride-co-hexafluoropropylene, polyvinylidene fluoride-co-chlorotrifluoroethylene, polyvinylidene fluoride-co-trichloroethylene, polyvinylidene fluoride-co-trifluoropropylene and polyvinylidene fluoride-co-tetrafluoropropylene, or a mixture of two or more them.

8. The free-standing porous separator according to claim 1, wherein the inorganic particles in the free-standing porous separator are bound to one another by the binder polymer, while the inorganic particles are packed and are in contact with one another, thereby forming interstitial volumes between the adjacent inorganic particles, and the interstitial volumes between the adjacent inorganic particles become vacant spaces to form pores.

9. The free-standing porous separator according to claim 1, wherein the free-standing porous separator has a thickness of 5-100 μm.

10. The free-standing porous separator according to claim 1, wherein a content of the ester (COO)- or carboxyl (COOH)-containing monomer moiety in the modified PVdF-based binder polymer is 0.1-4 wt % based on 100 wt % of the modified PVdF-based binder polymer.

11. The free-standing porous separator according to claim 1, wherein a content of the ester (COO)- or carboxyl (COOH)-containing monomer moiety in the modified PVdF-based binder polymer is 1-4 wt % based on 100 wt % of the modified PVdF-based binder polymer.

12. The free-standing porous separator according to claim 1, wherein a content of the modified polyvinylidene fluoride (PVdF)-based binder polymer is 13-27 wt %.

13. The free-standing porous separator according to claim 1, wherein a content of the modified polyvinylidene fluoride (PVdF)-based binder polymer is 18-22 wt %.

14. An electrochemical device comprising a positive electrode, a negative electrode and a separator interposed between the positive electrode and the negative electrode, wherein the separator is the free-standing porous separator as defined in claim 1.

15. The electrochemical device according to claim 14, wherein the electrochemical device is a lithium secondary battery.

16. A method for manufacturing the free-standing porous separator as defined in claim 1, comprising:
   preparing a slurry for forming a porous separator containing inorganic particles and a binder polymer;

applying the slurry to one surface of a release substrate;
drying the slurry; and
removing the release substrate.

17. The method for manufacturing the free-standing porous separator according to claim 16, wherein the slurry is applied to the release substrate through a solvent casting or slot coating process.

18. A method for manufacturing the free-standing porous separator as defined in claim 1, comprising:
preparing a slurry for forming a porous separator containing inorganic particles and a binder polymer; and
applying the slurry directly to one surface of at least one electrode layer selected from a positive electrode and a negative electrode, and
drying the slurry to obtain an electrode-porous separator composite bound directly to the electrode layer.

19. The method for manufacturing the free-standing porous separator according to claim 18, wherein the slurry is applied to the electrode layer through a solvent casting or slot coating process.

* * * * *